United States Patent [19]

Forino

[11] Patent Number: 4,842,869
[45] Date of Patent: Jun. 27, 1989

[54] METHOD FOR MAKING FERMENTED BEVERAGES

[76] Inventor: Vincent Forino, 2922 E. Main St., Waterbury, Conn. 06705

[21] Appl. No.: 204,888

[22] Filed: Jun. 10, 1988

[51] Int. Cl.$^4$ .......................... C12G 1/08; C12H 1/00; C12N 1/02
[52] U.S. Cl. .......................................... 426/8; 426/11; 426/15; 426/495; 99/277.1; 435/261
[58] Field of Search ................ 426/8, 11, 15, 16, 592, 426/316, 495; 99/276, 277.1; 435/287, 296, 261

[56] References Cited

U.S. PATENT DOCUMENTS

| | | | |
|---|---|---|---|
| 2,181,839 | 11/1939 | Tressler | 99/277.1 |
| 3,528,817 | 9/1970 | Barrett et al. | 99/35 |
| 4,164,902 | 8/1979 | Maarleveld | 99/277.1 |
| 4,517,884 | 5/1985 | Jandirch | 426/15 |
| 4,615,887 | 10/1986 | Hickinbotham | 426/8 |
| 4,748,123 | 5/1988 | Birch et al. | 435/261 |

*Primary Examiner*—Marianne Cintins
*Attorney, Agent, or Firm*—Jerry T. Kearns

[57] ABSTRACT

A yeast trap device for use in making fermented beverages includes a trap container having a tapered neck portion through which a fluid conduit is inserted. A closure seal on the container neck provides an airtight seal around the fluid conduit. In use, a lower end of the fluid conduit is inserted into a container filled with a fermentable beverage mixture. The upper end of the conduit has a circumferential array of drain apertures spaced slightly below the upper open end of the conduit. The trap container has an open top portion which may be covered with cheesecloth or with a rigid airtight cover provided with a labyrinth airlock. During fermentation, yeast and contaminants are transmitted in a fluid suspension through the conduit and into the trap container. The carbon dioxide produced during fermentation exits through the open upper end of the conduit. Yeast and contaminant material are retained within the trap container and prevented from returning to the beverage mixture.

3 Claims, 3 Drawing Sheets

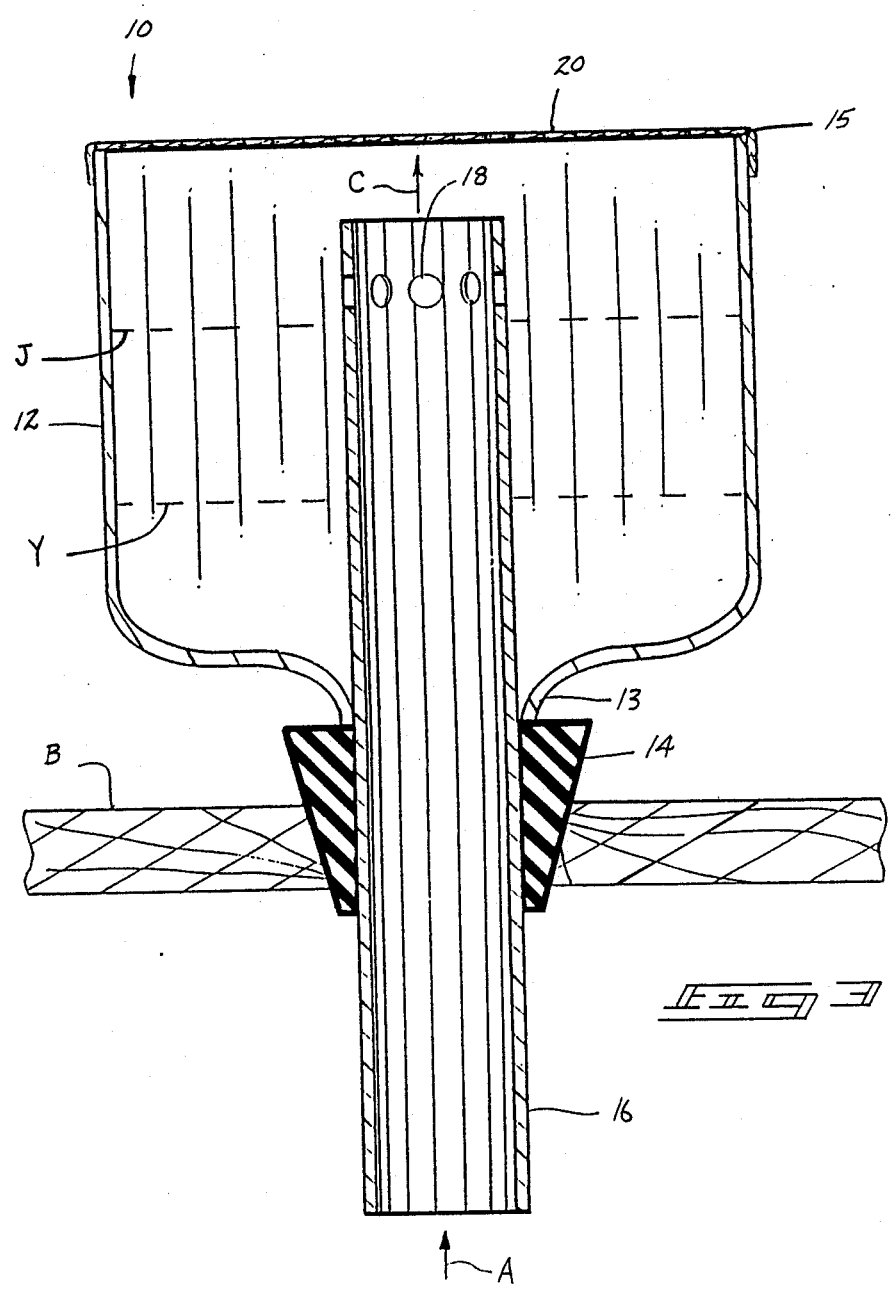

METHOD FOR MAKING FERMENTED BEVERAGES

BACKGROUND OF THE INVENTION

1. Field of the Invention

The present invention relates to trap devices, and more particularly pertains to a new and improved yeast trap device for use in making fermented beverages. In the conventional method of making wine, a mixture of grape juice and water is placed in a rigid container such as a glass jug or an oak barrel. Yeast is added to the mixture to produce alcohol from a fermentation process. The yeast feeds on the sugar in the juice and turns it into carbon dioxide and alcohol. The carbon dioxide escapes as gas bubbles which rise to the top of the fermentation container. The yeast actually controls the sugar separation of alcohol and carbon dioxide. A juice containing 24% percent sugar will ferment into a beverage mixture of 12% alcohol. Thus, 50% of the sugar is converted to alcohol. The remaining 50% of the sugar escapes as carbon dioxide. During the primary fermentation process, the yeast and the carbon dioxide rise to the surface of the fermentation container and spill out the top opening thereof. Typical containers include wooden barrels, glass jugs or carboys. This results in a loss of juice mixture which requires a continual addition of make up juice to continue the fermentation process. This also allows the spent yeast to reenter the juice, even with the use of conventional airlocks. To hasten the completion of the fermentation process, the yeast must exhaust the supply of fermentable sugar and become dormant. With the reduction in the amount of the yeast present in the fermenting beverage mixture, a secondary fermentation process continues to transform remaining sugar into alcohol and carbon dioxide with no liquid spillage from the fermentation container. After the fermentation process is completed, it is necessary to allow the fermented beverage mixture to settle for a protracted period of time to allow the wine to clear. There are many reasons why wines fail to clear of their own accord. The most common problem is the presence of a large quantity of suspended wine yeast. It is frequently necessary to allow the wine yeast to settle for periods as long as three to six months. Additionally, the presence of relatively large quantities of suspended yeast in the wine produce undesirable flavors. In order to solve these problems, the present invention provides a yeast trap device which is placed on the fermentation container on the first day of fermentation. The trap device allows carbon dioxide produce by fermentation of sugar in the juice to escape to the atmosphere and traps spent yeast while allowing the juice to reenter the fermentation container without any juice spillage.

2. Description of the Prior Art

Various types of trap devices are known in the prior art. A typical example of such a trap device for use in making fermented beverages is to be found in U.S. Pat. No. 3,528,817, which issued to H. Barrett et al on Sept. 15, 1970. This patent discloses a resilient bladder of stretchable material in open communication with the fermenting mixture for trapping evolved gases. U.S. Pat. No. 4,517,884, which issued to H. Jandirch on May 21, 1985, discloses a wine fermentation apparatus for use with a fermentation vessel to control the fermentation process therein. The apparatus utilizes a container connected by a pair of fluid conduits to the fermentation vessel. The juice and yeast mixture flows upwardly from the fermentation vessel through one of the conduits into an accumulator container. There, contaminants settle in the accumulator container and the juice flows downwardly through the second conduit back into the fermentation vessel. The use of these plural conduits has been found to unduly agitate the yeast and juice mixture in the accumulator container. This prevents the excess yeast from settling out of the juice mixture. While the return conduit of this device is situated at a lower level within the accumulator container, in practice during the early fermentation process the juice mixture flows upwardly from the fermentation vessel through both of the conduits. The fluid flowing through the lower return conduit contains a stream of carbon dioxide which effervesces into the lower portion of the accumulator container which results in a remixing of the settled and trapped yeast with the juice mixture. Thus, the device of Jandirch fails to provide an effective yeast trap. U.S. Pat. No. 4,615,887, which issued to S. Hickinbotham on Oct. 7, 1986, discloses a fermentation apparatus for producing wine which utilizes sealable plastic bags which include a one way valve to allow release but not reentry of gases. The containers preferably contain solid carbon dioxide to expel air by vaporization of the solid carbon dioxide.

While the above mentioned devices are suited for their intended usage, none of these devices provide a method of making a fermented beverage which utilizes a yeast trap having a fluid conduit with a circumferential array of drain apertures received within a trap container. Inasmuch as the art is relatively crowded with respect to these various types of trap devices, it can be appreciated that there is a continuing need for and interest in improvements to such trap devices, and in this respect, the present invention addresses this need and interest.

SUMMARY OF THE INVENTION

In view of the foregoing disadvantages inherent in the known types of trap devices now present in the prior art, the present invention provides an improved yeast trap device. As such, the general purpose of the present invention, which will be described subsequently in greater detail, is to provide a new and improved yeast trap device which has all the advantages of the prior art trap devices and none of the disadvantages.

To attain this, representative embodiments of the concepts of the present invention are illustrated in the drawings and make use of a trap container having a tapered neck portion through which a fluid conduit is inserted. A closure seal on the container neck provides an airtight seal around the fluid conduit. In use, a lower end of the fluid conduit is inserted into a container filled with a fermentable beverage mixture. The upper end of the conduit has a circumferential array of drain apertures spaced slightly below the upper open end of the conduit. The trap container has an open top portion which may be covered with cheesecloth or with a rigid airtight cover provided with a labyrinth airlock. During fermentation, yeast and contaminants are transmitted in a fluid suspension through the conduit and into the trap container. The carbon dioxide produced during fermentation exits through the open upper end of the conduit. Yeast and contaminant material are retained within the trap container and prevented from returning to the beverage mixture.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved yeast trap device which has all the advantages of the prior art trap devices and none of the disadvantages.

It is another object of the present invention to provide a new and improved yeast trap device which may be easily and efficiently manufactured and marketed.

It is a further object of the present invention to provide a new and improved yeast trap device which is of a durable and reliable construction.

An even further object of the present invention is to provide a new and improved yeast trap device which is susceptible of a low cost of manufacture with regard to both materials and labor, and which accordingly is then susceptible of low prices of sale to the consuming public, thereby making such trap devices economically available to the buying public.

Still yet another object of the present invention is to provide a new and improved yeast trap device which provides in the apparatuses and methods of the prior art some of the advantages thereof, while simultaneously overcoming some of the disadvantages normally associated therewith.

Still another object of the present invention is to provide a new and improved yeast trap device for use in a process for making fermented beverages.

Yet another object of the present invention is to provide a new and improved yeast trap device for use in the process of making fermented beverages which prevents spent yeast from reentering the fermenting beverage mixture.

Even still another object of the present invention is to provide a new and improved yeast trap device which prevents spillage of a fermenting beverage mixture through a top opening in a fermentation container.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross sectional view, taken along lines 3—3 of FIG. 2, illustrating the yeast trap according to the first embodiment of the present invention.

DESCRIPTION OF THE PREFERRED EMBODIMENT

Figure 1:
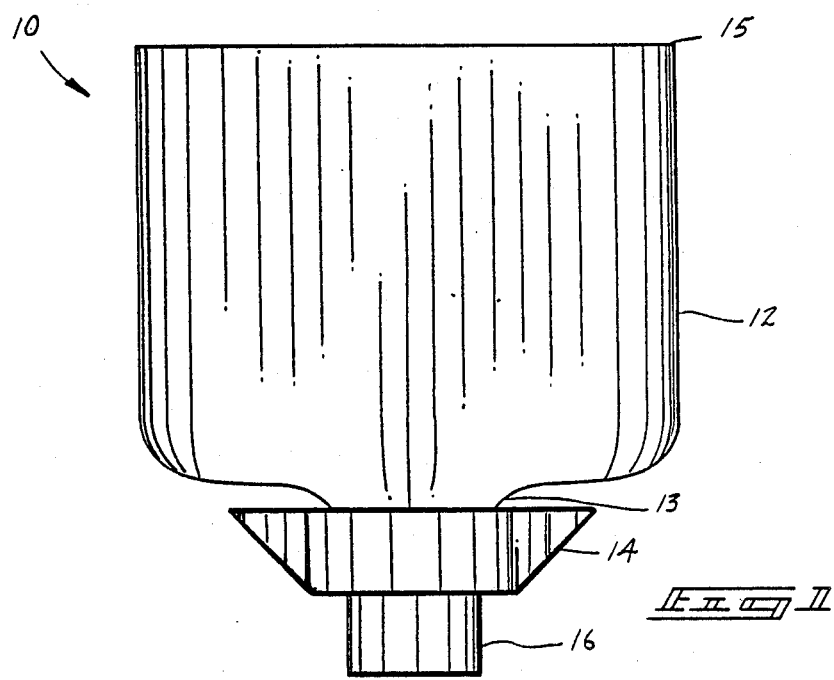
FIG. 1 is a side view of the yeast trap according to a first embodiment of the present invention.

With reference now to the drawings, and in particular to FIG. 1 thereof, a new and improved yeast trap device embodying the principles and concepts of the present invention and generally designated by the reference numeral 10 will be described.

More specifically, it will be noted that the first embodiment 10 of the invention includes a trap container 12 which has a tapered bottom neck portion 13 provided with a closure seal 14, which consists of a conventional rubber stopper. A fluid conduit 16 extends into the trap container 12 through the neck portion 13 and is sealed therein by the closure 14. The top portion 15 of the trap container 12 is open to the atmosphere.

Figure 2:
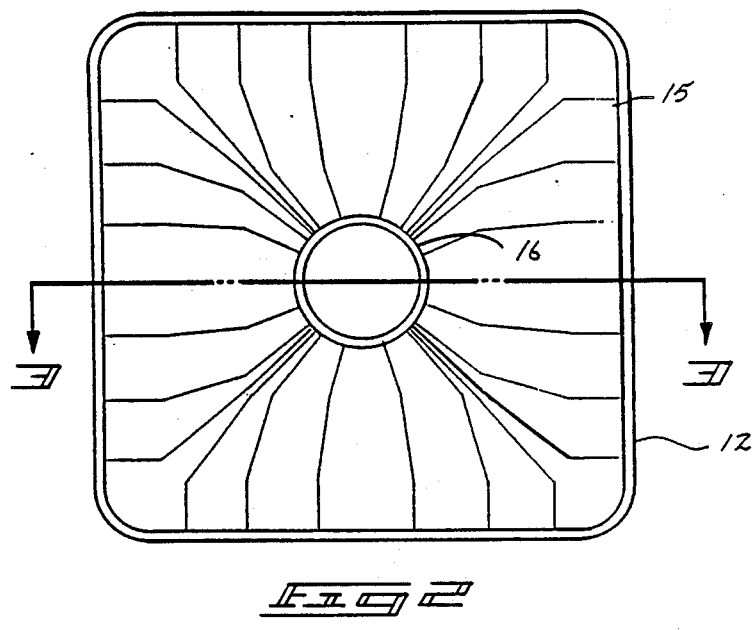
FIG. 2 is a top view of the yeast trap according to the first embodiment of the present invention.

FIG. 2 depicts a top view of the trap container 12 with the fluid conduit 16 received therein.

As shown in the cross sectional view of FIG. 3, the fluid conduit 16 extends through the tapered neck portion 13 of the trap container 12. The upper end of the conduit 16 extends to a level slightly below the open top portion 15 of the container 12. In use, a cover of cheesecloth 20 is placed over the top portion 15 of the container 12 to prevent airborne contaminants from falling therein. A circumferential array of evenly spaced circular drain apertures 18 are provided adjacent the upper end of the fluid conduit 18. In use, the lower end of the fluid conduit 16 is received through a top aperture in a fermentation container such as for example an oak wine barrel B. A mixture of grape juice and water are contained within the barrel B and are inoculated with a culture of wine yeast. During primary fermentation, a mass of juice, skins (if mashed grapes are utilized) and spent yeast is transmitted upwardly as indicated by the arrow A through the fluid conduit 16. The fluid stream contains particles of suspended yeast and other solid contaminants such as skin and pulp which are entrained in a stream of carbon dioxide gas bubbles. These contaminants can produce undesirable flavors if allowed to return to the wine. Additionally, these contaminants can form a breeding ground for spoilage bacteria. During the primary fermentation process the carbon dioxide escapes through the open upper end of the conduit 16 as indicated by the arrow C. The carbon dioxide exits the trap container 12 through the porous cheesecloth cover 20. The overflow juice mixture, which contains a large volume of suspended solid contaminants, exits the fluid conduit 16 through the drain apertures 18. The juice mixture then enters the trap container 12. Yeast and other solid suspended contaminants settle within the bottom of the container 12 to a level indicated by the dotted line Y. As the primary fermentation continues, the overflow juice mixture rises within the trap container 12 to a level indicated by the dotted line J. The overflow juice at this level contains a relatively large volume of suspended yeast and other contaminants which gradually settles to the bottom of the trap container 12. It should be noted that as overflow juice rises to the level of the drain apertures 18, it is allowed to reenter the fermentation barrel B through the conduit 16. This is not disadvantageous because this reentering juice has already been largely cleansed by the settling of the solid yeast and other contaminants suspended therein. Because the overflow juice is largely returned to the barrel B, there is no need for the addition of juice or other make up fluid to the barrel B as the fermentation process proceeds. After the rapid primary fermentation has subsided, the secondary fermentation stage begins, which is a slower process which does not produce an overflow of the juice mixture into the trap container 12.

Figure 4:
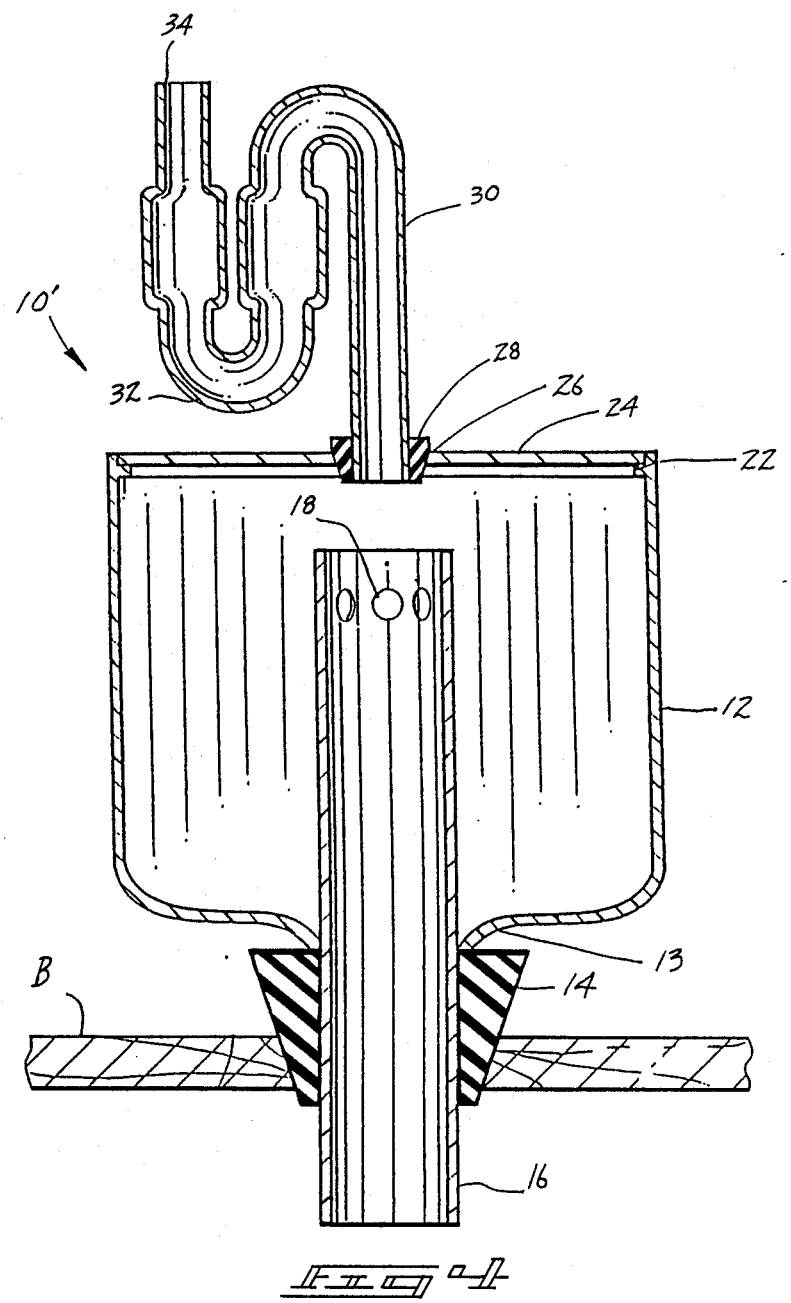
FIG. 4 is a cross sectional view similar to FIG. 3, but illustrating a modified form of yeast trap according to a second embodiment of the present invention.

In FIG. 4, a second embodiment of a yeast trap 10' is illustrated. The second embodiment 10' is substantially similar to the first embodiment 10, with the exception that an annular radially inwardly extending flange 22 is formed around the top of the trap container 12. A rigid cover 24 is received by the flange 22 and provides an airtight closure for the trap container 12. A circular aperture 26 extends through the cover 24 and receives a conventional rubber stopper 28. The inlet tube portion 30 of a conventional labyrinth type airlock 32 extends through the stopper 28, into communication with the interior of the trap container 12. The outlet portion 34 extends upwardly, away from the trap container 12, and is open to the atmosphere in a conventional fashion. In use, the labyrinth airlock portion 32 is filled with water, thus producing a fluid seal. During fermentation, carbon dioxide escaping through the conduit 18 into the trap container 12 exits through the airlock portion 30, bubbles through the water in the labyrinth airlock 32 and escapes to the atmosphere through the outlet 34.

In summary, the yeast trap device of the present invention permits the escape of carbon dioxide gas, spent yeast and other solid contaminants from the fermenting beverage mixture and allows reentry of the overflow beverage mixture after it has been cleansed through a settling process. The unique configuration of the drain apertures 18 in the conduit 16 allows return of excess overflow fluid, after suspended contaminants settle out into the bottom of the trap container 12, without disturbing the settled contaminants. This provides a yeast trap which is more effective and produces a higher quality product than was heretofore obtainable using the prior art yeast trap devices.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of making a fermented beverage comprising the steps of:
   providing a fermentation container having a top opening;
   filling said fermentation container with a beverage mixture of a sugar containing liquid, and yeast;
   providing a fluid conduit inserted into the fermentation container top opening;
   providing a trap container having a narrow bottom neck portion receiving said fluid conduit;
   providing a sealing closure sealing said fluid conduit in airtight relation within said trap container and sealing said fluid conduit within the fermentation container;
   said top container having an open top;
   providing a cover over said trap container open top;
   said fluid conduit having an open upper end terminating slightly below said cover;
   providing a circumferential array of evenly spaced drain apertures in said fluid conduit spaced slightly below the upper end thereof; and
   allowing said beverage mixture to ferment causing a portion of said beverage mixture and suspended contaminants to flow through said fluid conduit, out said drain apertures and into said trap container.

2. The method of claim 1, further comprising the step of providing a cheesecloth cover over said trap container.

3. The method of claim 1, further comprising the step of providing a removable rigid cover supported in sealing engagement with said trap container;
   providing a central circular aperture formed through said cover;
   providing a stopper in said central circular aperture; and
   providing a labyrinth airlock on said stopper.

* * * * *